United States Patent [19]
Leplingard et al.

[11] Patent Number: 5,654,229
[45] Date of Patent: Aug. 5, 1997

[54] METHOD FOR REPLICATING PERIODIC NONLINEAR COEFFICIENT PATTERNING DURING AND AFTER GROWTH OF EPITAXIAL FERROELECTRIC OXIDE FILMS

[75] Inventors: Florence E. Leplingard, Palo Alto; John J. Kingston, Oakland; Ross D. Bringans, Cupertino; David K. Fork; Robert G. Waarts, both of Palo Alto; David F. Welch, Menlo Park; Randall S. Geels, San Jose, all of Calif.

[73] Assignee: Xerox Corporation, Stamford, Conn.

[21] Appl. No.: 430,005

[22] Filed: Apr. 26, 1995

[51] Int. Cl.$^6$ .................................. H01L 21/20
[52] U.S. Cl. .................. 117/56; 385/130; 117/58; 117/90; 117/106; 117/948; 117/918
[58] Field of Search ............... 437/129; 385/130

[56] References Cited

U.S. PATENT DOCUMENTS

| | | |
|---|---|---|
| 4,951,293 | 8/1990 | Yamamoto et al. |
| 5,193,023 | 3/1993 | Yamada et al. |
| 5,253,259 | 10/1993 | Yamamoto et al. ............ 385/130 |
| 5,295,218 | 3/1994 | Agostimelli et al. ........... 385/130 |
| 5,323,023 | 6/1994 | Fork . |
| 5,539,569 | 7/1996 | Fukuda et al. ................. 385/130 |

OTHER PUBLICATIONS

M.J. Angell, et al., Orientation Patterning of II–VI Semiconductor Films for Quasi–Phasematched Nonlinear Devices, Integrated Photonics Research 93 Palm Springs, pp. 472–474.

F. Armani, D. Delacourt, E. Lallier, M. Papuchon, Q. He, M. De Micheli and D. B. Ostrowsky, First Order Quasiphase Matching in LiNbO$_3$, Electronics Letters vol. 28, No. 2, pp. 139–140 (1992).

Robert C. Baumann, Timothy A. Rost, Thomas A. Rabson, Electrical Characterization of Ferroelectric Thin Films of Lithium Niobate on Silicon Substrates, Mat. Res. Soc. Symp. Proc. vol. 200–Ferroelectric Thin Films, edited by E. Myers, et al., pp. 31–36 (1990).

W.K. Burns, *Senior Member, IEE*, W. McElhanon and L. Goldberg, Second Harmonic Generaltion in Field Poled, Quasi–Phase–Matched, Bulk LiNbO$_3$, IEEE Photonics Technology Letters, vol. 6, No. 2, pp. 252–254 (Feb. 1994).

(List continued on next page.)

*Primary Examiner*—Charles L. Bowers, Jr.
*Assistant Examiner*—Ramamohan Rao Paladugu

[57] ABSTRACT

A method for providing an nonlinear, frequency converting optical QPM waveguide device by growing a first ferroelectric oxide film or layer on a second ferroelectric layer or medium wherein, in first and second embodiments, respectively, the second layer is initially provided with a periodic nonlinear coefficient pattern or a periodic pattern comprising a seed layer. During the growth of the first layer, the periodic pattern formed in the second layer, is replicated, transformed or induced into the first layer resulting in a plurality of substantially rectangular prismatic-shaped domains in the first layer having the periodic nonlinear coefficient pattern status based upon the periodic patterning of the second layer. In a third embodiment, the periodic nonlinear coefficient pattern may be introduced into the first layer after completion of its growth, and the periodic nonlinear coefficient pattern status of the first layer, at the interface between the first and second layers, is transposed or migrated into the second layer forming a plurality of substantially rectangular prismatic-shaped domains in the second layer having the periodic nonlinear coefficient pattern status of the first layer. In the first and second embodiments, the optical QPM waveguide is the first layer and in the third embodiment, the optical QPM waveguide is the second layer.

48 Claims, 7 Drawing Sheets

OTHER PUBLICATIONS

D. Delacourt, F. Armani, and M. Papuchon, Second–Harmonic Generation Efficiency in Periodically Poled LiNbO$_3$ Waveguides, IEEE Journal of Quantum Electronics, vol. 30., No. 4, pp. 1090–1099 (Apr. 1994).

Martin M. Fejer, G. A. Magel, Dieter H. Jundt, and Robert L. Byer, Quasi–Phase Matched Second Harmonic Generation: Tuning and Tolerances, IEEE Journal of Quantum Electronics, vol. 28, No. 11, pp. 2631–2654, Nov. 1992.

Jeff Hecht, Semiconductor Diode Lasers Span the Rainbow, Laser Focus World, pp. 199–211 (Apr. 1993).

J.L. Jackel, C. E. Rice, and J.J. Veselka, Proton Exchange for High–Index Waveguides in LiNbO$_3$, Appl. Phys. Lett. 41(7), pp. 607–608 (1992).

E.J. Lim, M.M. Fejer, R.L. Byer and W.J. Kozlovsky, Blue Light Generation by Frequency Doubling in Periodically Poled Lithium Niobate Channel Waveguide, Electronics Letters, vol. 25, No. 11, pp. 731–732 (1989).

R.S. Madoyan and O.A. Khachaturyan, Domain and Dislocation Structure of Lithium Niobate Epitaxial Film, Sov. Phys. Solid State 29(9), pp. 1578–1580 (Sep. 1987).

Kiminori Mizuuchi, and Kazuhisa Yamamoto, Domain Inversion in LiTaO$_3$ Using Proton Exchange Followed by Heat Treatment, J. Appl. Phys. 75(3), pp. 1311–1318 (1994).

Hiroshi Momiji, Kazumi Kawamoto, and Kenchi Ito, Fabrication of a Periodically Domain–Inverted Structure in LiNbO$_3$ Thin Film by a Domain Transfer Technique, Appl. Phys. Lett. 65(17), pp. 2154–2155, (1994).

Kiyoshi Nakamura, Haruyasu Ando, and Hiroshi Shimizu, Ferroelectric Domain Inversion Caused in LiNbO$_3$ Plates by Heat Treatment, Appl. Phys. Lett. 50(20), pp.1413–1414 (1987).

Derek W. Nam and Robert G. Waarts, Advanced Laser Diodes Bring Compact Blue–Green Sources to Light, Laser Focus World, pp. 49–55 (Aug. 1994).

Timothy A. Rost, He Lin, and Thomas A. Rabson, Electrical Switching in Lithium Niobate Thin Films, International Symposium on Integrated Ferroelectrics 1991, pp. 644–648.

Hitoshi Tamada, Atsuo Yamada, and Masaki Saitoh, LiNbO$_3$ Thin–Film Optical Waveguide Grown by Liquid Phase Epitaxy and Its Application to Second–Harmonic Generation, J. Appl. Phys. 70(5), pp. 70(5), pp. 2536–2541 (1991).

Atsuo Yamada, Hitoshi Tamada and Masaki Saitoh, Liquid Phase Epitaxial Growth of LiNbO$_3$ Thin Film Using Li$_2$O–B$_2$O$_3$ Flux System, Journal of Crystal Growth (North Holland)132, pp. 48–60 (1993).

Amnon Yariv, Quantum Electronics Third Edition, Chapter 16 ("Introduction to Nonlinear Optics–Second–Harmonic Generation"), pp. 378–406 (1989).

METHOD FOR REPLICATING PERIODIC NONLINEAR COEFFICIENT PATTERNING DURING AND AFTER GROWTH OF EPITAXIAL FERROELECTRIC OXIDE FILMS

GOVERNMENT RIGHTS

This invention was made with government support under the Advanced Technology Program award number 70NANB2H1241 awarded by the Department of Commerce. The government has certain rights under this invention.

RELATED INVENTIONS

This application is related to U.S. Pat. No. 5,323,023 and pending U.S. patent application Ser. No. 07/798,672, filed Nov. 26, 1991, a continuation of which was filed on Oct. 7, 1993 with Ser. No. 08/133,817, both assigned to the Xerox Corporation, a co-assignee of this application, and is related to pending U.S. application Ser. No. 07/949,452, filed Sep. 21, 1992 and assigned to SDL, Inc., a co-assignee of this invention.

FIELD OF THE INVENTION

This invention relates generally to methods for the preparation of films to form devices for optical frequency conversion by quasi-phase matching (QPM), and more particularly to the growth or formation of thin oxide films replicating established nonlinear coefficient patterning present at the surface of an adjacent film, layer, sublayer or medium, wherein the formed replicating films are employed as efficient frequency conversion waveguides.

BACKGROUND OF THE INVENTION

Visible light lasers, particularly blue and green lasers, are more desirable than infrared lasers for certain applications such as optical storage, printing and displays, because of their operational wavelengths. Using a laser operating at a shorter wavelength has advantages in a number of applications. For example, an optical disc can store approximately four times more information on the disc if a blue laser operating in the visible wavelength range is employed for the read/write functions rather than the infrared laser, as currently used, because the storage space on a disc is roughly proportional to the square of the wavelength. Also, laser printers using blue lasers could print with a higher resolution than printers using an infrared laser.

While infrared laser diodes have been known and utilized for a number of years, technological difficulties are still encountered for diode lasers emitting in the blue/green range. Researchers have focused on using high bandgap semiconductor materials, such as zinc selenide (ZnSe), a II–VI semiconductor material, and more recently on gallium nitride (GaN, a III–V semiconductor) for fabricating blue diode lasers.

An alternative approach to obtain blue or green light is to pass infrared light, generated by an infrared laser diode which is fabricated from III–V semiconductor materials, through a nonlinear crystal which converts the frequency of a portion of the infrared light to a larger frequency. The doubling of the frequency is discussed herein as an example of this frequency conversion. The infrared spectrum runs from approximately 780 nm to more than 10 microns while the spectrum for blue light is approximately 400 nm to 490 nm and the spectrum for green light is approximately 490 nm to 560 nm. Since doubling the frequency is equivalent to halving the wavelength of the light, when an infrared laser light passes through a frequency doubling optical crystal, a blue or green laser (which is half of the wavelength of the infrared light) is emitted from the waveguide output. The infrared light is referred to as the "fundamental wave" and the blue or green light generated by the frequency doubling is the "second harmonic wave". The process of frequency doubling is also commonly referred to as second harmonic generation ("SHG"). SHG can be realized in the employment of an optical waveguide to increase the efficiency of frequency conversion.

For an optical waveguide to emit blue or green light at the end of the waveguide, the fundamental and second harmonic waves propagate the entire length of the waveguide. The length over which these waves must propagate is the "propagation length".

Frequency doubling requires that the fundamental and second-harmonic waves stay in phase as much as possible in a nonlinear crystal or film, which creates the frequency doubling. Because the index of refraction in the nonlinear materials, including nonlinear optical waveguides, differs for the different wavelengths of the fundamental and second-harmonic waves, the light waves travel through the nonlinear optical waveguide at different speeds. The second harmonic wave, therefore, grows and, concomitantly, the frequency doubled light grows in power and intensity, until the point at which the two waves are out of phase by $\pi$. The crystal length over which the waves fall out of phase by $\pi$ is the "coherence length". The second-harmonic wave would begin decaying towards zero amplitude after the first coherence length and would be of zero amplitude when the phase difference is $2\pi$, that is, two coherence lengths. The same mechanism will be reproduced throughout the propagation length. If the coherence length is a few microns, the harmonic power generated is too small for practical use.

A particular optical nonlinear coefficient, $[d_{ij}]$, is associated with each nonlinear optical material. A list of nonlinear coefficients for various crystals appears in the published work A. Yariv, "Quantum Electronics", at page 387 (J. Wiley & Sons, 1989).

To keep the fundamental and second harmonic waves in phase, the birefringence properties of the nonlinear material can be used which allows the maintenance of the fundamental and harmonic waves in phase and is used for frequency doubling using bulk materials. However, because of the necessary orientation of the crystal, birefringence uses a nonlinear coefficient of the crystal, e.g., $d_{31}$, $d_{32}$, rather than the larger $d_{33}$ nonlinear coefficient of the crystal, which exists parallel to the +z orientation (for example, for $LiNbO_3$: $d_{31}$~5–6 pm/V, while $d_{33}$~34 pm/V). In addition, in thin film waveguides, it is not always possible to phase match the two fundamental modes. Modal dispersion can be used to realize phase matching between modes of different order. However, because the overlap between the two modes is very low in general, the phase matching achieved using modal dispersion is not efficient.

Therefore, in frequency doubling materials, such as lithium niobate ($LiNbO_3$) and lithium tantalate ($LiTaO_3$), the alternative technique of quasi-phase matching (QPM) is used to impose a modulation or periodic nonlinear coefficient patterning, one type of which comprises a polarization reversal pattern. This type of patterning is also referred to as a "poling pattern", which is formed in the doubling bulk crystal. Using this approach, the ferroelectric polarization of a ferroelectric crystal is periodically reversed, thereby creating a grating or pattern in the crystal comprising alternating positive and negative domains. The sign of the nonlinear coefficient of the crystal in one domain is reversed with reference to adjacent domain(s) having the opposite sign. For the polarization reversal to be most efficient, periodic poling is performed at a period along the crystal corresponding to twice the coherence length, $l_c$, where $l_c = \pi/\Delta\beta$ with $\Delta\beta$ equal to the difference in propagation vectors of the fundamental and second harmonic and with each domain being of equal width. This is known as first-order QPM.

Quasi-phase-matching is most efficient where there are abrupt reversals in domains which extend vertically through the portion of material to be used as the waveguide, creating vertical walls or boundaries between the domains. In cases where the domain boundaries are at an angle, i.e., nonperpendicular to the longitudinal extent of the waveguide, the frequency conversion efficiency is reduced. Only a portion of infrared light can be converted to blue or green light by the waveguide because the half period of the periodic nonlinear coefficient pattern will not be consistently equal to an integer multiple of the coherence length since the duty cycle of the periodic nonlinear coefficient pattern is a function of waveguide medium depth. The mount of blue or green light that is emitted divided by the amount of infrared light entering the waveguide equals the conversion efficiency of the waveguide in creating the desired blue or green light.

The second harmonic generation (SHG) power of the blue or green light generated in the nonlinear waveguide is proportional to the square of the propagation length and is also proportional to the square of the nonlinear coefficient of the material used in the waveguide. Therefore, to increase efficiency of such a crystal, one should create as long a propagation length as possible, and use a nonlinear material with a high nonlinear coefficient.

It is also desirable to confine the light to as small a region as possible because the power of the visible light generated is inversely proportional to the square of the intensity of the infrared light. The SHG efficiency is, in turn, proportional to the infrared power density. Therefore, using a waveguide made with thin film technology to confine the light, instead of directly coupling the light into a bulk crystal material, can significantly enhance the SHG efficiency.

There are a number of conventional, alternative methods for creating a periodic nonlinear coefficient pattern in a crystal to provide periodic poling such as in crystal bulk materials. Examples of such methods are titanium indiffusion in $LiNbO_3$, proton exchange followed by an anneal in $LiTaO_3$, and by heat treatment. See E. J. Lira et at., "Blue Light Generation by Frequency Doubling in Periodically Poled Lithium Niobate Channel Waveguide", *Electronics Letters*, Vol. 25(11), pp. 731–732 (1989); K. Mizuuchi et al., "Domain Inversion in $LiTaO_3$ Using Proton Exchange Followed by Heat Treatment", 75 *J. Appl. Phys.*, Vol. 75(3), pp. 1311 et seq., (1994); and K. Nakamura, et al., "Ferroelectric Domain Inversion Caused in $LiNbO_3$ Plates by Heat Treatment", *Applied Physics Letters*, Vol. 50(20), p. 1413 et seq, (1987). It is also known to achieve periodic poling in thin oxide films by applying an electric field and then using these poled films as waveguides. See, for example, W. K. Burns et at., "Second Harmonic Generation in Field Poled, Quasi-Phase-Matched, Bulk $LiNbO_3$", *IEEE. Photonics Technology Letters*, Vol. 6(2), pp. 252–254 (February, 1994); T. A. Rost et al., "Electrical Switching in Lithium Niobate Thin Films", International Symposium on Integrated Ferroelectrics (ISIF), 1991; F. W. Ainger, "Ferroelectric Thin Films by Metal Organic Chemical Vapour Deposition", *Material Research Society Symposium Proceedings*, Vol. 200, p. 37 et seq.

However, these poling techniques can be difficult to apply in periodic nonlinear coefficient patterning of thin films. For instance, the underlying substrate (perhaps, already containing a formed semiconductor laser) cannot be heated to an arbitrarily high temperature. More particularly, titanium indiffusion must be performed at about 1000° C. in $LiNbO_3$. However, the substrate on which the thin film has been deposited, or the film itself, may not sustain such high temperatures. Also, for some of the bulk crystal techniques, the material has to be multi-domain or uniformly poled in one particular direction before periodic nonlinear coefficient pattering, which may be difficult to control during the growth of the thin film. As for electric field induced poling, this process may be useful in bulk crystal material. However, if the film has been deposited on an insulating material, such as a sapphire substrate, field poling becomes more difficult to apply because as most of the voltage drop is across the insulating substrate or low dielectric sublayer so that there is no way to remove or dissipate the charge developed from the applied field in order to achieve the desired ferroelectric phase in the material.

SUMMARY OF THE INVENTION

An object of this invention is a method and device for producing quasi phase matched (QPM) optical frequency conversion.

Another object of this invention is the provision of a method for replicating an incorporated, periodic nonlinear coefficient pattern from a layer or medium to an adjacent layer or medium to produce a device that provides for QPM in an optical waveguide medium.

It is another object of this invention to grow epitaxial thin oxide films on previously periodic nonlinear coefficient patterned substrates or sublayers, such that substantially rectangular prismatic-shaped domains are formed throughout the depth of as-grown film, forming optical frequency conversion waveguides on insulating substrates or insulating intermediate layers that efficiently generate visible light from infrared laser diode light.

It is a further object of this invention to fabricate highly efficient frequency conversion devices either monolithically, with the infrared light source on the same substrate as the oxide film, or with the laser and frequency conversion device in close proximity to be optically coupled to one another.

It is still another object of this invention to make an optical waveguide which is more efficient and less expensive than currently available thin film optical nonlinear waveguides.

In accordance with these objects, this invention provides a method for fabricating an optical waveguide, such as, for a QPM frequency converting waveguide for conversion of infrared light into visible light, by means of inducement or replicating nonlinear coefficient pattern properties from a first layer into a second layer, such as, by inducement of pre-existing domain properties from an underlayer during the growth of an overlayer into the overlayer, or incorporation of domain properties through an overlayer to an underlayer after the growth of the overlayer and migration of the domain. Three embodiments are disclosed for illustrating the invention. The first two embodiments relate to the creation of a periodically poled (periodic sign alternation of the optical nonlinear coefficient) or periodically modulated (periodic modulation of the optical nonlinear coefficient)

overlayer accomplished during its epitaxial growth on an underlayer, sublayer or bulk crystal medium, which overlayer serves as an optical waveguide medium. The third embodiment relates to a periodically poling or modulating of an underlayer or crystal bulk medium through an overlayer after its epitaxial growth, which underlayer serves as an optical waveguide medium.

In accordance with the first embodiment of this invention, a nonlinear, frequency converting optical waveguide is formed from a ferroelectric oxide by means of epitaxial growth having periodic nonlinear coefficient pattern induced and replicated in the overlayer concurrently with its epitaxial growth. The method comprises the periodic nonlinear coefficient patterning of an underlayer, sublayer, crystal bulk medium or substrate (hereinafter, for convenience, collectively referred to as "underlayer"), comprising a ferroelectric oxide, forming a periodic nonlinear coefficient pattern. "Periodic nonlinear coefficient patterning", as genetically used herein, may be one of at least two different possible patterns or gratings, for example, a periodic poled pattern of positive and negative nonlinear coefficients or a periodic modulated pattern of either first positive or negative nonlinear coefficients and a second nonlinear coefficient of comparatively low magnitude or of zero magnitude, i.e., no nonlinearity. The first pattern provides for a series of substantially rectangular shaped domain patterns along an upper surface of the underlayer. However, within the underlayer, these boundaries are not necessarily parallel or perpendicular with the upper surface of the underlayer, e.g., they are triangular-shaped, semicircular-shaped, or trapezoidal-shaped types of boundaries. These kinds of shaped domains in a waveguide medium contribute to a reduction in frequency conversion because the half period of the chosen nonlinear coefficient pattern will not be consistently equal to an integer multiple of the coherence length since the duty cycle of the periodic nonlinear coefficient pattern is a function of waveguide medium depth.

An overlayer is, then, deposited on the underlayer by means of epitaxial growth, such as by sputtering, replicating in the overlayer the periodic nonlinear coefficient pattern at the underlayer surface concurrently with the deposition of the overlayer. As a result, a plurality of domains, previously formed in the underlayer, are automatically replicated in the overlayer throughout its entire thickness in conformance with the periodic nonlinear coefficient pattern of the initially formed domains in the underlayer. The domains in the overlayer, therefore, have substantially the same length, width and pattern status as the domains in the underlayer. More importantly, the domains formed within the overlayer have substantially straight-line vertical boundaries in substantially rectangular fashion along the horizontal plane of the overlayer thereby improving the QPM properties of the overlayer.

In accordance with this first embodiment, a nonlinear, frequency conversion, optical waveguide comprises an overlayer on an underlayer wherein the underlayer, comprising a ferroelectric oxide, is periodically patterned into a plurality of domains having a nonlinear coefficient pattern status formed along an upper surface of the underlayer. After periodic nonlinear coefficient patterning of the underlayer, a thin film overlayer, comprising a ferroelectric oxide, is epitaxially grown on the patterned underlayer. The periodic nonlinear coefficient patterning of the underlayer is replicated in the overlayer during its epitaxial growth resulting in an induced, modulated pattern of replicated domains having a nonlinear coefficient pattern status of the initially formed domains of the underlayer. The replicated domains are substantially of rectangular prismatic-shaped configuration and continuous through the entire thickness of the deposited overlayer. The replicated domains in the overlayer, therefore, have substantially the same length, width and pattern status as the initial domains formed in the underlayer. Moreover, the replicated domains have substantially vertical boundaries throughout the thickness of the overlayer as contrasted to the nonperpendicular-shaped boundaries formed in periodic nonlinear coefficient patterning of the underlayer.

In accordance with a second embodiment of this invention, a method is provided for periodic nonlinear coefficient patterning of an epitaxially grown, nonlinear thin film overlayer, comprising a ferroelectric oxide, which is utilized as a nonlinear, frequency converting optical waveguide. The waveguide is formed by, first, forming a seed layer on an underlayer, the formed seed layer comprising either a pattern of spatially formed seed material between which is exposed region of the underlying layer, or alternating regions of two different kinds of materials, one of which can be, but not necessarily, a ferroelectric oxide. In the latter case, the underlying layer need not be a ferroelectric oxide so that the seed layer is the underlying layer. Next, an overlayer is epitaxially grown on the formed seed layer whereby the overlayer forms a periodic nonlinear coefficient pattern status according to the material of the underlayer so that each domain formed in the overlayer is disposed directly above a corresponding material of the underlying seed layer. In other words, a pattern of domains formed in the underlying seed layer provides a periodic nonlinear coefficient pattern status dependent on the pattern of deposited seed material or materials. A plurality of replicated domains are formed in the overlayer having a periodic nonlinear coefficient pattern status corresponding to the periodic nonlinear coefficient pattern status of the underlying seed layer. The replicated domains in the overlayer, therefore, have substantially the same length, width and pattern status as the seed layer domains with substantially vertical domain boundaries formed throughout the thickness of the overlayer. An example of the periodic nonlinear coefficient pattern is a poling pattern comprising alternating domains of reversed polarization in the formed thin film optical waveguide.

In accordance with this second embodiment, a nonlinear, frequency conversion, optical waveguide comprises an overlayer and underlayer comprising a formed seed layer having alternating regions comprising at least one kind of seed material wherein a periodic nonlinear coefficient pattern is formed along an upper surface of the deposited seed layer. A nonlinear thin film overlayer, comprising a ferroelectric oxide, is epitaxially deposited on the seed layer. The periodic pattern status established in the underlying seed layer is transformed in the overlayer during the growth of the overlayer with a periodic nonlinear coefficient pattern in the overlayer. Thus, a plurality of domains are formed in the overlayer having a periodic nonlinear coefficient pattern status corresponding to the periodic pattern status established in the underlying seed layer.

In accordance with a third embodiment of this invention, a method is provided for replicated, periodic nonlinear coefficient patterning of an underlayer comprising a ferroelectric oxide medium which is utilized as a nonlinear, frequency converting optical waveguide. First, a thin film overlayer comprising a ferroelectric oxide is formed on the underlayer by means of epitaxial growth. The periodic nonlinear coefficient patterning of both the overlayer and the underlayer is accomplished after completion of the deposition of the overlayer. Periodic nonlinear coefficient patterning of the overlayer is then initiated along an upper surface of the overlying layer employing either conventional chemical or conventional electrical modulating techniques forming a plurality of domains of a prescribed periodic nonlinear coefficient pattern status, such as, either alternating domains of reversed polarization or periodic spatially formed nonlinear coefficient domains between regions of substantially optical linear coefficiency. The prescribed periodic nonlinear coefficient pattern status is formed along the surface of the overlayer and penetrating this layer to its bottom surface forming a pattern of surface regions of substantially rectangular configuration along the overlayer bottom surface. Next, this periodic nonlinear coefficient surface pattern is replicated into the underlayer by means of the sustaining electric field properties in the modulated overlayer, forming a plurality of domains in the underlayer having a periodic nonlinear coefficient pattern status replicating the proscribed periodic nonlinear coefficient pattern status at the interface of the layers. The underlayer domains have substantially the same length and width as the domains at the overlayer bottom surface and have a defined depth into the underlayer with substantially formed straight-line vertical domain boundaries incorporating the periodicity of the overlayer domain pattern formed along the interface of the layers.

In each of the foregoing embodiments, the periodic nonlinear coefficient pattern may comprise a pattern of alternating positive and negative nonlinear coefficient elements, or a pattern of alternating first positive or negative nonlinear coefficient elements with second nonlinear coefficient elements either having a magnitude significantly smaller than the magnitude of the first nonlinear coefficient or having a magnitude equal to zero.

In summary, by the practice of the method of this invention, a nonlinear optical QPM thin film waveguide can be achieved through the utilization of an additional layer replicating the periodic nonlinear coefficient pattern of an initial layer wherein the additional layer contains a plurality of rectangular prismatic-shaped domains through the film thickness or a portion of the bulk crystal having substantially formed straight-line vertical domain boundaries providing for uniform QPM.

PREFERRED EMBODIMENTS OF THE INVENTION

1. Introduction: Definition of Periodic Nonlinear Coefficient Patterning Relative to an As-Grown or After-Grown Layer In the terminology used in describing this invention, the term, "periodic nonlinear coefficient patterning", is intended to mean any periodic pattern that modulates the optical nonlinear coefficient of a thin film in a manner providing QPM, and is generally known relative to two types of patterns: a periodic poled pattern of positive and negative nonlinear coefficients (e.g., +, −, +, −, +. . . ), or a periodic modulated pattern of either first positive or negative nonlinear coefficients and a second nonlinear coefficient of comparatively low magnitude or of zero magnitude, i.e., no nonlinearity or null (e.g., +, 0, +, 0, +. . . ; or −, 0, −, 0, −. . . ).

2. Periodic Nonlinear Coefficient Patterning of an Overlayer for Use as an Optical Waveguide Device.

A. Periodic Nonlinear Coefficient Patterning of an Overlayer During Epitaxial Growth on a Substrate or a Sublayer ("Underlying Medium").

In this first embodiment, a nonlinear thin film overlayer, comprising a ferroelectric oxide, is subjected to periodic nonlinear coefficient patterning. Periodic modulation of the nonlinear coefficient of the overlayer is achieved by first poling a ferroelectric oxide underlayer, thin layer or substrate, hereinafter all referred to as "medium" or "underlying medium", employing conventional surface-initiated methods, such as by titanium indiffusion, proton exchange followed by an anneal treatment, or by heat treatment. Then, a thin ferroelectric oxide film is epitaxially grown on the top surface of the oxide medium. The growth of the overlayer is carded out so that the poling pattern of the underlying medium is replicated in the oxide overlayer which is then employed as a frequency conversion waveguide device.

Two alternative approaches are described for creating the optical waveguide device of this first embodiment. The first of these approaches results in the device shown in FIG. 1(b) and the second results in the device shown in FIG. 1(d).

Figure 1B:
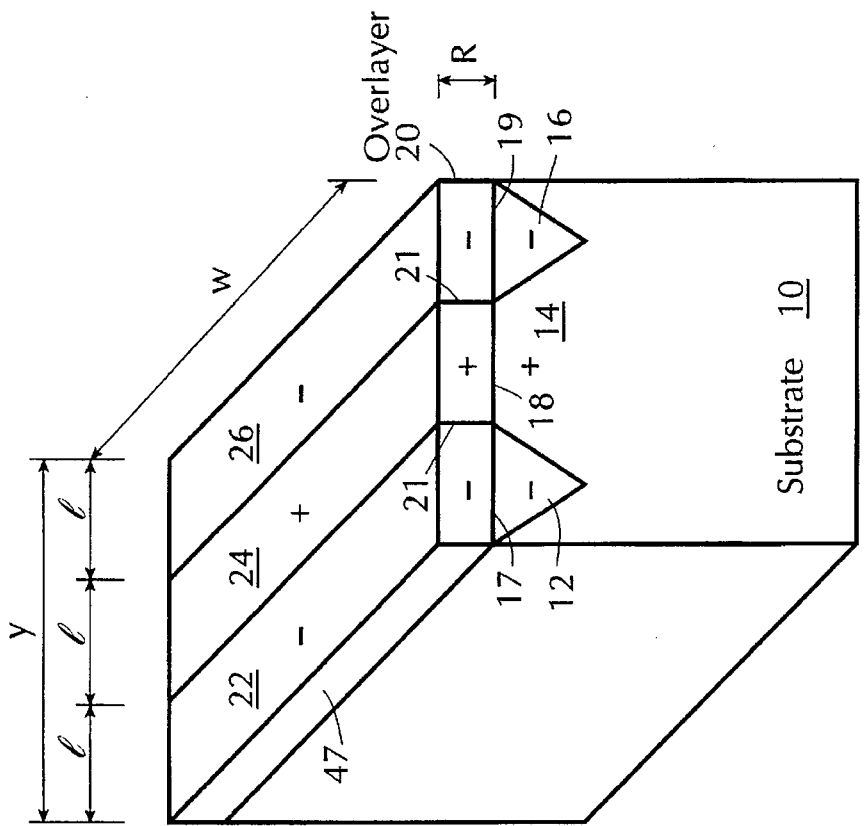
FIG. 1(b) is a perspective view of a device according to the first embodiment of this invention in which an as-grown thin film overlayer has been poled replicating the periodic poling of the substrate of FIG. 1(a) during the growth of the overlayer.
Figure 1A:
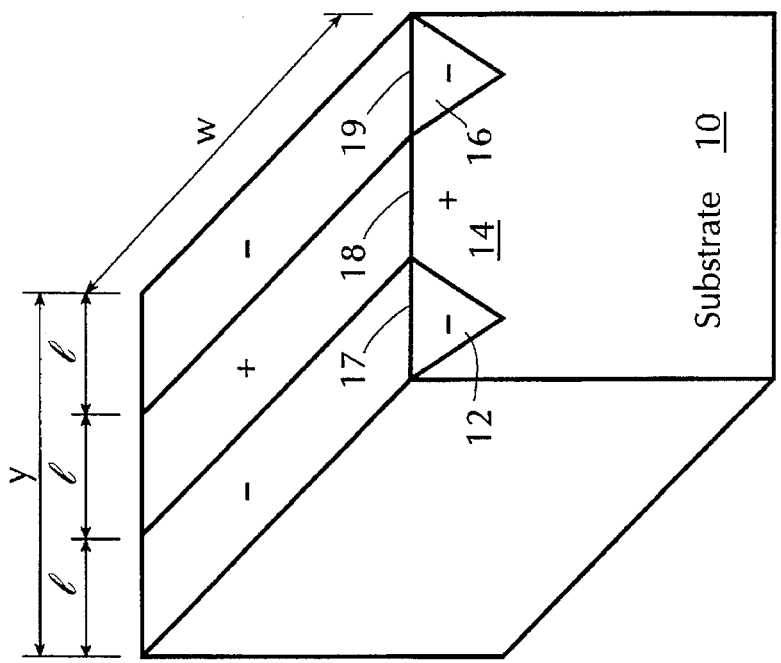
FIG. 1(a) is a perspective view of a substrate comprised of a ferroelectric oxide wherein the upper portion of a substrate has been periodically poled.

FIG. 1(a) illustrates a device comprising a substrate 10 wherein the upper portion of substrate 10 has been periodically poled into domains 12, 14, 16. The substrate 10 comprises LiNbO$_3$, although it may also be comprised of LiTaO$_3$. Titanium (Ti) is diffused onto a +z cut crystal of LiNbO$_3$ results in the formation of triangular poled domains 12, 16 of negative nonlinear coefficient. One method of preparing the periodically poled LiNbO$_3$ substrate shown in FIG. 1(a) is detailed in E. J. Lira et al., "Blue Light Generation by Frequency Doubling in Periodically Poled Lithium Niobate Channel Waveguide", *Electronics letters*, Vol. 25(11), pp. 731-732 (1989), which is incorporated herein by reference thereto. Polarization reversal results in a first domain 12 having a negative nonlinear coefficient (represented by a "−" sign), an adjacent, second, adjacent domain 14 having a positive nonlinear coefficient (represented by a "+" sign), and a third domain 16, adjacent to the second domain, having a negative nonlinear coefficient. This periodic nonlinear coefficient patterning of negative and positive nonlinear coefficient provides a "−, +, −. . ." polarization pattern along the length, y, of the upper surface of substrate 10.

The employment of currently known methods of periodic poling, such as titanium indiffusion, provides the formation of domains that are generally not vertical, i.e., the spatially formed domains do not have side boundaries substantially perpendicular to the horizontal planar surface of substrate 10. This is due to the diffusion properties of the ferroelectric material comprising substrate 10. Upper surfaces 17, 18, 19 of domains 12, 14, 16, respectively, each have a substantially rectangular shape of width, w, and length, 1. It is preferable for domains 12, 14, 16 to be of equal length, 1, where 1 is a multiple of the coherence length, $l_c$, of the crystal.

Figure 1D:
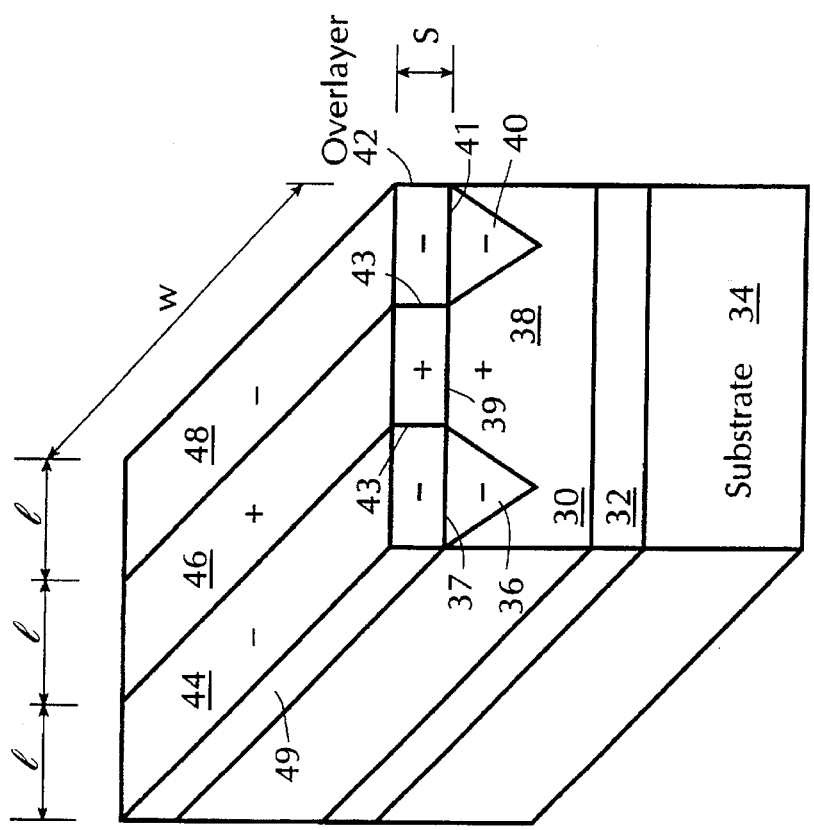
FIG. 1(d) is a perspective view of another device according to the first embodiment of this invention in which a periodic poled overlayer is grown above the poled sublayer of FIG. 1(c) replicating the periodic poling pattern of the sublayer.
Figure 1C:
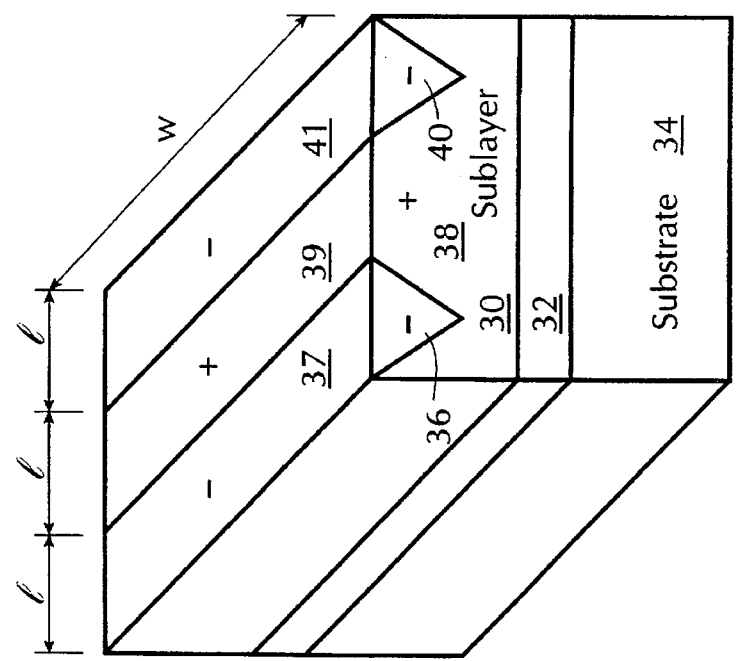
FIG. 1(c) is a perspective view of a periodic poled ferroelectric oxide sublayer formed on a buffer or buffer layer formed on a substrate.

FIG. 1(c) illustrates an alternative underlayer structure for the device for practicing the first embodiment comprising a sublayer 30 which is epitaxially grown on a buffer layer 32 which, in turn, is epitaxially grown on a substrate 34. Buffer layer 32 functions in this embodiment, as well as in the second embodiment, as a light confinement layer. U.S. Pat. No. 5,323,023 to Fork, which is incorporated herein by reference, teaches at col. 4, line 65-col. 5, line 54, one method of growing this structure wherein substrate 34 is silicon-doped CaAs, buffer layer 32 is grown on the (111) surface of substrate 34 comprises (111) MgO and the sublayer 30 is LiNbO$_3$. MgO has good chemical and crystallographic compatibility with LiNbO$_3$. Selective titanium indiffusion on the surface of the LiNbO$_3$ sublayer spatially forms triangular negatively poled domains 36, 40 in the sublayer 30. The polarization reversal creates a plurality of domains, including domains 36, 38, 40, whose nonlinear coefficients alternate between positive and negative signs. The upper surfaces 37, 39, 41 of the domains 36, 38, 40 have a substantially rectangular shape of width, w, and length, 1.

On the substrate 10 (FIG. 1(a)) or sublayer 30 (FIG. 1(b)), which are hereinafter when referred together are referred to as "support medium", an overlayer (20 in FIG. 1(b) and 42 in FIG. 1(d)) is epitaxially grown. Any epitaxial growth method may be used to grow the overlayer, including, but not limited to, liquid phase epitaxy (LPE), sputter deposition, e-beam deposition, pulsed laser deposition and MOCVD, in particular, a solid source MOCVD system.

EXAMPLE 1

As an example of particular processing to achieve the proper properties for the overlayer in the first embodiment, a rf magnetron sputtering system is employed using a sintered, stoichiometric LiNbO$_3$ target. Substrate 10, comprising LiNbO$_3$, are radiatively heated and rotated to ensure uniform heating and film deposition. Substrate 10 is cleaned in 1:1 H$_2$SO$_4$:H$_2$O$_2$ for about 10 minutes and then rinsed in H$_2$O and ethanol and then spun dried. The substrate is next properly poled, in the manner as previously explained, and is, then, mounted on a holder using silver paste to help absorb radiant heat. The holder with mounted substrate is inserted into the sputtering vacuum chamber. The holder is radiant heated and is radiated to insure uniform heating of the substrate as well as prevent the formation of irregularities in the deposited film, especially in ultra thin films. Substrate 10 is also positioned off-axis in the sputtering chamber and normal to the sputter target in proximity to the main body of the developed plasma envelope. Substrate 10 is positioned off-axis in order to reduce the full effect of high energy negative ions (O$^-$ and LiO$^-$) on the growing film. Otherwise, the direct effect of these ions, which are produced by a dc field at the target surface, is to cause a loss of stoichiometry at the growing film surface as well as morphological changes in the film. Ar$_2$ is introduced into the chamber and an Ar plasma is generated. O$_2$ is introduced into the chamber during the deposition process and the flow rate into the chamber is controlled to achieve the desired stoichiometric composition comprising LiNbO$_3$. In particular, the mounted substrate for the particular sputtering chamber used to produce the LiNbO$_3$ films was positioned about 6.5 cm from the target and about 4 cm off from the edge of the target. If the substrate is placed in a more direct position of the accelerated ions, the proper stoichiometric composition will not be deposited on the substrate but, rather, other phases, such as the Li rich phase, Li$_3$NbO$_4$, or the Li poor phase, LiNb$_3$O$_8$, both of which have no ferroelectric properties, will be deposited on the mounted support medium. Thus, by placing the mounted support medium offset relative to the target and out of the main plasma envelope, the loss of Li from the growing film is held under control and the proper stoichiometric composition can be achieve with the proper temperature conditions and proper Ar$_2$/O$_2$ ratio, given the sputter gas pressure and rf power.

Relative to the preferred parameters for the particular sputtering system employed for the production of films in this example, the optimum temperature is in the range of 650° C. to 750° C., and a mixture ratio of Ar$_2$/O$_2$, in particular, the partial pressure of O$_2$, is adjusted so that the desired stoichiometric composition is achieved. If the temperature exceeds this upper value too much, other phases are produced so that a mixture of phases having a mixed paraelectric/ferroelectric nature results. If the temperature is too much below the lower value of this range, a niobium or lithium rich phase is introduced so that a mixture of phases having a mixed paraelectric/ferroelectric nature results.

By changing the partial pressure of O$_2$, the proper ferroelectric phase can be accurately achieved in the epitaxial deposition process. For example, the change in the Ar$_2$:O$_2$ ratio might be varied in the range of about 8:0.2 to 8:0.9 in order to achieve the proper phase. For the particular sputtering system employed, a temperature of around 740° C. was applied with a mixture ratio of argon and oxygen of 8:0.57 and a total system pressure of 2 mTorr to provide the desired stoichiometric LiNbO$_3$ overlayer 20 on offset mounted substrate 10. The LiNbO$_3$ target was sputtered for about 110 minutes resulting in the deposition of a thin film overlayer 20 having a thickness of about 250 nm. After deposition, the device is slowly cooled to room temperature in an oxygen ambient in a pressure of about 100 Torr alter which the substrate with the deposited film was removed from the vacuum chamber. The resulting films were x-rayed and showed correspondence in alignment of the c axis of LiNbO$_3$ overlying film 20 with the c axis of LiNbO$_3$ substrate 10.

Instead of LiNbO$_3$, as a substrate 10 or other support medium 30, a different ferroelectric oxide may be employed. Also, overlayer 20, 42 may be a sputtered thin film comprising LiTaO$_3$, barium titanate (BaTiO$_3$), KTP, potassium niobate (KNbO$_3$), strontium barium niobate (SBN), or KTO. Moreover, the growth of overlayer 20, 42 can be homoepitaxial one, i.e. the same ferroelectric oxide employed for the overlayer may be identical to the support medium as well as heteroepitaxial, i.e. comprising different ferroelectric oxides.

As an alternative to MgO as a buffer layer, buffer layer 32 may comprise materials, such as calcium fluoride (CaF$_2$) or spinel (MgAl$_2$O$_4$) which, like MgO, have a refractive index lower than substrate 34, which can be GaAs. Using a material having a lower refractive index in the buffer layer confines light incident as an input to and coupled into the higher index overlayer 42, functioning as a nonlinear waveguide. In addition to providing refractive index, the buffer layer 32 permits growth of a good quality thin film on a substrate 34 of GaAs. It also serves as a protective layer, allowing an oxide layer to be epitaxially grown at a high temperature, even as high as 980° C., without decomposition of a GaAs substrate or other such substrate with a low decomposition temperature, when the out-diffusion of arsenic from GaAs begins to occur at around 400° C. Moreover, the substrate 34 could be of silicon (Si) rather than GaAs.

The thin film grows in general with small grains of oxide material which are approximately 1000 Å=100 nm in diameter (approximately 1/10th the size of the wavelength of the infrared fundamental light which is approximately 1 μm). To avoid creating a domain larger than a coherence length, $lc$, which would cause a decay in the second harmonic efficiency, and to achieve more efficient QPM SHG, grains which are smaller than a coherence length and which have fine-grained columnar growth, such as commonly observed with LiNbO$_3$ grains grown on a sapphire substrate, are preferred.

If the grains which grow in an area of particular polarization replicate the polarization of the surface on which they nucleate up to the final boundary of the domains, substantially straight-line vertical walls 21 (FIG. 1(b)) and 43 (FIG. 1(d)) between the domains which extend from the lower surface to the upper surface of overlayer 20, 42 will be observed even though the walls formed between domains in support medium 10, 30 are not vertical. Thus, overlayer 20, 42 preferably grows forming a plurality of substantially rectangular domains of substantially the same width, length and nonlinear coefficient pattern as the width, length and nonlinear coefficient pattern of the upper surface of the domains formed in the substrate or sublayer directly beneath the overlayer. Each formed domain in the overlayer is created substantially through the entire thickness of the overlayer. In FIG. 1(b), domains 22, 24 and 26 grow in a substantially rectangular prismatic-shaped configuration through substantially the entire thickness, R, of overlayer 20 with substantially the same length, l, and width, w, of the domain pattern formed upper surfaces 17, 18, 19 of respective domains 12, 14, 16. In FIG. 1(d), domains 44, 46, 48 grow in a substantially rectangular shape through substantially the entire thickness, S, of overlayer 42 with substantially the same length, l, and width, w, of the domain pattern formed along upper surfaces 37, 39, 41 of respective sublayer domains 36, 38, 40.

Thus, the underlying periodic nonlinear coefficient pattern forms a replicated pattern in the overlayer with substantially vertical walls or boundaries between the domains rendering the overlayer highly suitable as a nonlinear optical waveguide because the vertical boundary domains of overlayer 20, 42 optimize the propagation path length required for efficient quasi-phase matching in the frequency conversion of the propagating light.

Figure 2B:
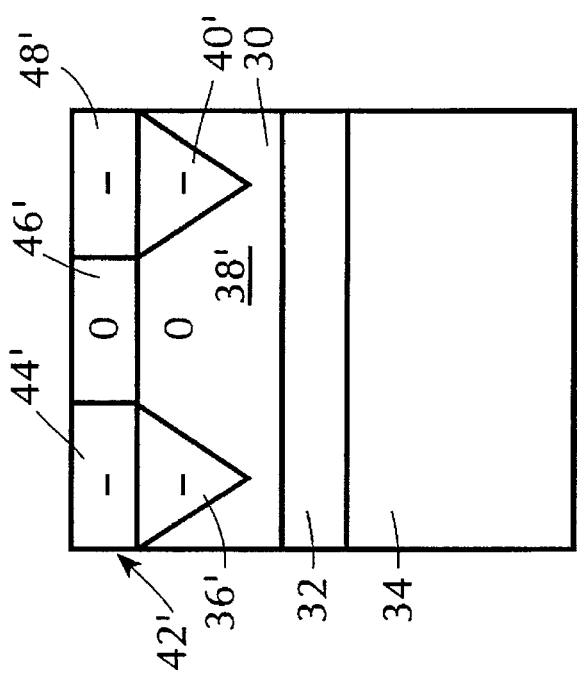
FIGS. 2(a) and 2(b) respectively illustrate side elevations of devices of FIG. 1(b) and 1(d) but illustrating a different periodic nonlinear coefficient pattern comprising nonlinear optical coefficient null regions alternated with nonlinear coefficient regions.
Figure 2A:
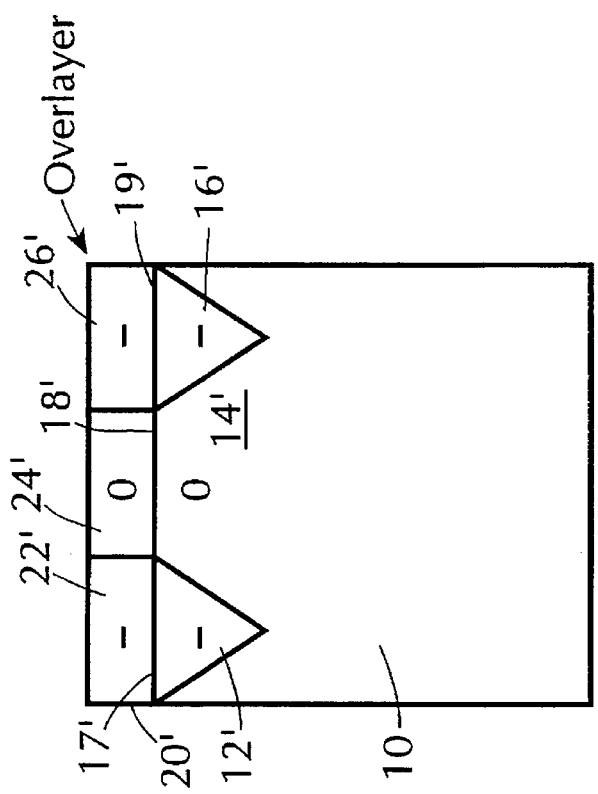

As an alternative to forming a grating or pattern by modulating the sign of the nonlinear coefficients, i.e., a poled pattern, a modulated nonlinear coefficient pattern may be comprised of a plurality of domains in the overlayer wherein one set of domain has a first nonlinear coefficient of a particular polarization and a second set of domains, alternated with the first set of domains, either comprising a second nonlinear coefficient of magnitude significantly smaller than the magnitude of the first nonlinear coefficient or having a magnitude equal to zero (no nonlinear coefficient). An example of the pattern for the last mentioned magnitude of zero comprises a "−, 0, −, 0, . . . ", and is shown in FIG. 2(a) and 2(b) as periodic nonlinear coefficient pattern 12', 14', 16' formed in overlayer 20' on substrate 10 and in overlayer 42' on sublayer 30. In the case of FIG. 2(a), the modulated pattern of "−, 0, −, 0, . . ." is formed in substrate 10. This pattern is obtained by employing a ferroelectric oxide substrate, e.g., LiNbO$_3$ or LiTaO$_3$, which is patterned so that exposed surfaces of the substrate are provided with a proton exchange in benzoic acid. The domain surface pattern on the top surface of substrate 10 is replicated during growth into overlayer 20' forming the rectangular prismatic-shaped configuration for domains 22', 24', 26'. Substrate 10, for example, may be LiNbO$_3$ and overlayer 20' may be epitaxially grown LiNbO$_3$. In the case of FIG. 2(b), modulated pattern 36', 38', 40' of "−, 0, −, 0, . . ." is formed in sublayer 30, and the domain surface pattern on the top surface of sublayer 30 is replicated during growth into overlayer 42' forming the rectangular prismatic-shaped configuration for domains 44', 46', 48'. Sublayer 30 may be, for example, LiNbO$_3$ formed on buffer layer 32 comprising MgO formed on substrate 34 of GaAs. While this approach may simplify device fabrication because of the need to only delineate the periodic nonlinear coefficient pattern spatially along the layer, the efficiency of the resulting frequency doubling is not as good as in the case of a poled pattern.

Figure 3:
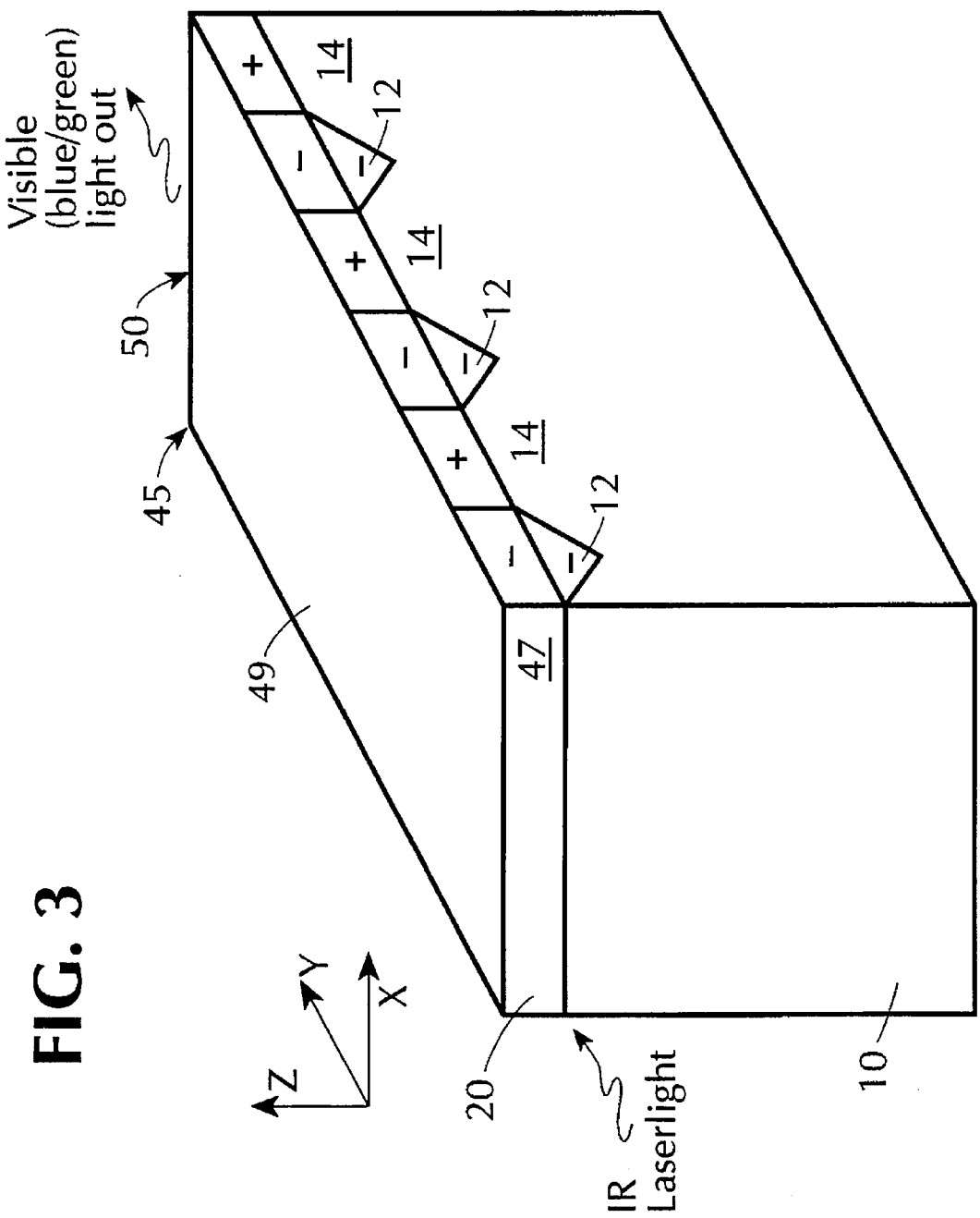
FIG. 3 is a perspective view of an optical, frequency conversion waveguide device of FIG. 1(b) with light incident on an input and doubled frequency light emitted from an output.

The formed device shown in FIG. 1(b), for example, may be utilized as an optical frequency conversion waveguide 45, shown in FIG. 3. Infrared laser light can be focused on input surface 47 of waveguide 45 so that the light propagates in the y direction traversing alternating domains of poled pattern 12, 14. Visible blue or green laser light is generated along the waveguide and collected at the opposite, output surface 50 of waveguide 45. Similarly, for the structure of FIG. 1(d), overlayer 42 may be employed as a waveguide medium with light incident on input surface 49 and collected at output surface 50 of overlayer 42.

Where substrate 34 comprises GaAs or other conventionally employed materials used in fabrication of a laser light source, this invention permits the laser light source to be integrated on the same substrate in adjacent, optically coupled relation to the formed optical frequency conversion waveguide. The laser light beam may then be focused directly at an angle of approximately 90° and coupled into the waveguide to provide highly efficient coupling of the incident laser light.

As is well known, the refractive index of support medium 10, 30 is lower than the refractive index of respective overlayer 20, 42 so that the highest index is central to the propagating light in the waveguide. Such relative indices are obtained where, for example, a sublayer of LiNbO$_3$: MgO, LiTaO$_3$ or KTP is present under an overlayer of LiNbO$_3$ so that the refractive indices of LiNbO$_3$: MgO, LiTaO$_3$, KTP are less than the refractive index of LiNbO$_3$. Alternatively, if the overlayer is comprised of a material with the same or lower index, e.g., KTP over KTP, the refractive index of the overlayer can be increased by doping the overlayer, such as a KTP overlayer through an exchange with Rb.

Support medium 10, 30 can advantageously comprise a material having a low Curie temperature for providing a lower processing temperature for producing the poled or other such modulated pattern in the medium so that, as a result, good stoichiometric overlayer material can be grown. Therefore, overlayer 20, 42 can be comprised of optimal frequency doubling material which would normally require a high processing temperature to create polarization reversal in the thin film and can be grown already poled at a comparatively low temperature, typically in the temperature range between 650° C.–750° C. For example, the structure of FIG. 1(d) may comprise a GaAs substrate, a MgO buffer layer, a LiTaO$_3$ sublayer employing a processing temperature of approximately 600° C., which is close to its Curie temperature of about 610° C., and, finally, a LiNbO$_3$ overlayer. BaTiO$_3$, which has a low Curie temperature of approximately 120° C., is another ferroelectric material which may be employed for support medium 10, 30 utilizing a processing temperature just below its Curie temperature to create the periodic pattern. When a poled ferroelectric oxide is heated above its Curie temperature, the material becomes paraelectric, losing its nonlinearity and its poling properties. After cool down, the poling will appear random throughout the film. Before growing a ferroelectric oxide overlayer with a high processing temperature, such as LiNbO$_3$, on an underlayer having a low processing temperature, such as LiTaO$_3$, it is expedient to alloy or dope the underlayer with a material which raises the Curie temperature of the underlayer so that the poling or modulation of the underlayer is not destroyed during processing. In the case here, LiTaO$_3$ may be doped with MgO in order to raise its Curie temperature. To alloy substrate 10 for such purposes, a diffusion process may be employed, or substrate 10 can be doped during the growth in the melt in the case of LPE. To alloy sublayer 30, sublayer 30 can be doped during growth by incorporating the alloy material during the growth process by providing it in the target composition, or in the melt, in the case of LPE, or in the gas mixture introduced into the reaction chamber in the case of MOCVD.

The underlayer can also comprise a material which has a low coercitivity field for polarization reversal, even though it may not be of optimal frequency doubling material. BaTiO$_3$ is one such material with a low coercitivity field. An overlayer having optimal optical properties with a high coercitivity field can then be utilized. For example, a LiNbO$_3$ overlayer 42 can be grown on a BaTiO$_3$ sublayer 30, which is provided on a MgO buffer layer 32 formed on a GaAs substrate 34. Before the growth of LiNbO$_3$, the BaTiO$_3$ sublayer 30 is poled just below its Curie temperature of about 120° C. using a low field of a few volts per cm. Poling overlayer 42 of LiNbO$_3$ directly with such a low field would have required heating the sample close to its Curie temperature which is about 1200° C., which is not practical. Poling the LiNbO$_3$ overlayer 42 at room temperature, however, requires a high field, such as 20–30 V/μm which can lead to the breakdown of the crystal. Thus, replicating the poling in LiNbO$_3$ overlayer during its growth alleviates this problem relative to high temperature processing.

B. Periodic Nonlinear Coefficient Patterning of an Overlayer During Epitaxial Growth on a Seed Layer.

In the second embodiment of this invention, an underlayer comprises at least one "seed" material or a combination of two different "seed" materials, and the overlayer forming an optical waveguide is poled or modulated as the overlayer is grown on the underlying seed layer according to the seed material.

Figure 4A:
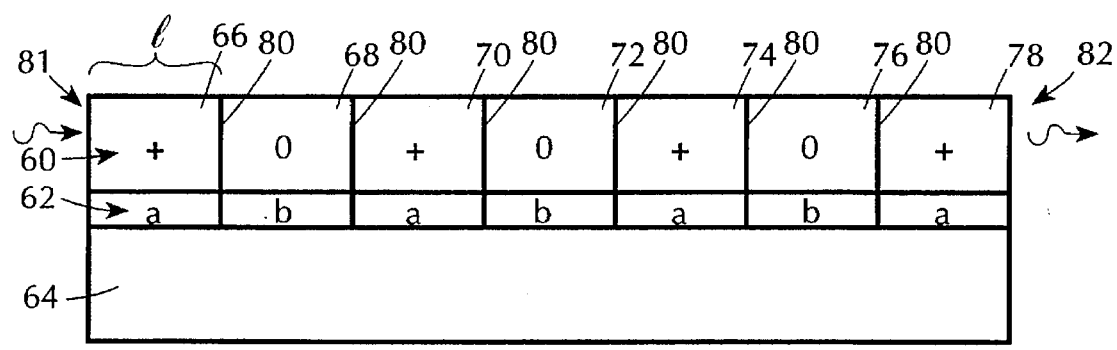
FIG. 4(a) is a side view of a device according to a second embodiment of this invention comprising an overlayer which is periodically modulated as-grown on a seed layer consisting of two seed materials, "a" and "b".

In FIG. 4(a), seed layer 62 is formed on support medium 64, which may be a substrate, e.g., sapphire, or a buffer layer, e.g., MgO. In this figure, seed layer 62 is comprised of two different materials "a" and "b", which material will effect overgrowth properties in a manner that overlayer 60 will transform the nonlinear coefficient as imposed by seed layer 62. Seed layer 62 is very thin, for example, 10 Å to 20 Å thick.

The process of forming seed layer 62 starts with the formation of a layer comprising the material "b", which may be, for example, Si$_3$N$_4$ or SiO$_2$ on support medium 64. This layer may be formed by sputtering. Next, photolithography is employed by first forming a photoresist layer over the material "b" layer followed by exposure and development to form a pattern of strips or regions. The regions of material "b" not covered by the exposed photoresist are removed by etching forming surface strip regions on support medium 64. The remaining pattern of spatially formed photoresist strips as well as the exposed strip regions of support medium 64 individually have a length equal to the desired coherence length. Next, a second seed layer comprising material "a" is deposited, such as by sputtering, upon the surface which may possess nonlinearity properties, e.g., LiTaO$_3$ LiNbO$_3$, or may be of other material, such as Al$_2$O$_3$ or MgO. The growth may be from 20 Å to 40 Å thick. An etchback is then performed to remove a portion of the deposited layer of material "a" until this layer is planar with the formed strips of material "b", resulting in seed layer 62 as shown in FIG. 4(a). The resulting thickness of seed layer 62 may be about 10 Å to 20 Å. Next, overlayer 60, comprising the waveguide medium, is formed by means, for example, of sputtering, e.g., LiTaO$_3$ or LiNbO$_3$. As a result, domains 66–78 are transformed into overlayer 60 during its epitaxial growth if growth conditions are appropriate. The established poling direction present in the periodic nonlinear coefficient pattern established in overlayer 60 is influenced by the properties of the seed materials, "a" and "b".

Another manner of forming seed layer material "b" is by first depositing a photoresist layer on the surface of support medium 64 followed by pattern exposure according to the desired coherence length to form a pattern of spatially disposed strips of photoresist. Next, a seed material, such as Si$_3$N$_4$, is deposited in the form of an overlayer covering the spatial strip pattern of photoresist. Next, a liftoff process is utilized to remove the regions comprising the previously formed spatial pattern of photoresist. Thus, what remains after liftoff is a spatial pattern of Si$_3$N$_4$ strips according to the desired coherence length. Next, a layer of "a" material is formed over the Si$_3$N$_4$ pattern, such as sapphire or LiNbO$_3$. This layer is then etched back to form a planar layer of alternating regions of "a" and "b" material of equal length.

Appropriate materials "a" and "b" for seed layer 62 are materials on which an overlayer can be grown epitaxially and with a known periodic nonlinear pattern status, including positive, negative or zero polarization. For example, in seed layer 62 of FIG. 4(a), material "b" may be silicon nitride (Si$_3$N$_4$), or silicon oxide (SiO$_2$) on which LiNbO$_3$ or other such ferroelectric material will grow amorphous with a zero nonlinear coefficient. Materials "a", on which LiNbO$_3$ or other such ferroelectric material is capable of growing with a +z axis orientation are sapphire (Al$_2$O$_3$), and MgO.

Other materials for either material "a" or "b" are spinel, calcium fluoride, or magnesium fluoride (MgF$_2$).

EXAMPLE 2

Overlayer 60 may be comprised of a thin oxide film, such as, LiNbO$_3$, LiTaO$_3$, BaTiO$_3$, KTP, KNbO$_3$, or SBN. Where material "b" in seed layer 62 is sapphire and material "a" is Si$_3$N$_4$, an overlayer 60 of LiNbO$_3$ is grown on seed layer 62 employing a rf magnetron sputtering system.

Substrate 64, comprising Al$_2$O$_3$-c, is cleaned in 1:1 H$_2$SO$_4$:H$_2$O$_2$ for about 10 minutes and then rinsed in H$_2$O and ethanol and then spun dried. Next, the seed material "b" of sputtered Si$_3$N$_4$ is formed in spatially formed strips according to the coherence length, as previously explained, followed by the formation of seed material "a" of sputtered Al$_2$O$_3$ with appropriate etchback as required. Then, substrate 64 with formed seed layer 62 of an alternating pattern of "a", "b" materials, is mounted on a holder using silver paste to help absorb radiant heat. The holder with mounted substrate is inserted into the rf magnetron sputtering chamber with a sintered, stoichiometric LiNbO$_3$ target. Substrate 64 is radiatively heated and rotated to ensure uniform heating of substrate 64 and uniform film deposition. Also, substrate 64 is positioned off-axis in the sputtering chamber and normal to the sputter target in proximity to the main body of the developed plasma envelope. Substrate 10 is positioned off-axis in order to reduce the full effect of high energy negative ions (O$^-$ and LiO$^-$) on the growing film. Otherwise, the direct effect of these ions, which are produced by a dc field at the target surface, is to cause a loss of stoichiometry at the growing film surface as well as morphological changes in the; film.

Next, a mixture of argon and oxygen in the ratio of 8:0.57 at a total pressure of 2 mTorr is introduced into the sputtering chamber and seed layer 62 is sputtered for about 110 minutes resulting in the deposition of a LiNbO$_3$ film having a film thickness of about 250 nm. After deposition of this overlayer 60, the device is slowly cooled to room temperature in about 100 Torr of oxygen and then removed from the vacuum chamber. As confirmed by x-ray analysis, overlayer 60 grows forming domains 66, 70, 74, 78 above the sapphire material "a" having a positive nonlinear coefficient and forming domains 68, 72, 76 above the Si$_3$N$_4$ material "b" having a nonlinear coefficient equal to zero. The domains formed in overlayer 60 are of rectangular prismatic-configuration, having substantially formed vertical walls 80 between domains 66–78 which extend in a straight-line fashion through the thickness of overlayer 60. The length, l, and width, w, of these domains substantially equal the length and width of the region of pattered seed materials "a" and "b" formed by seed layer 62. For maximum conversion efficiency, the regions in seed layer 62 are designed so that domains 66–78 in overlayer 60 are each equal to coherence length, l$_c$.

As with the first embodiment of the invention, overlayer 60 forms a periodic nonlinear pattern employed as a frequency doubling waveguide. Infrared laser light enters the waveguide formed by the overlayer at input surface 81 and visible blue or green light and infrared laser light is emitted from output surface 82. The modulation of the sign of the nonlinear coefficient results in frequency doubling of infrared light passing through the periodic nonlinear coefficient pattern.

Figure 4B:
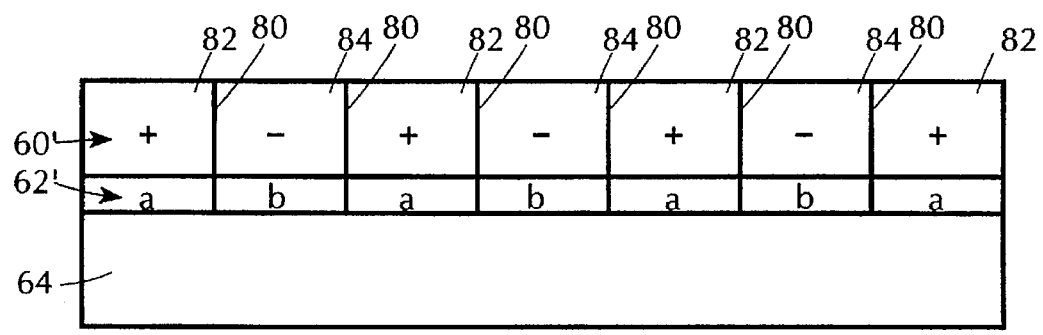
FIG. 4(b) is a side view of a device formed according to the second embodiment of this invention comprising an overlayer which is periodically poled as-grown on a seed layer consisting of two seed materials, "a" and "b".

In this second embodiment, employing appropriate materials and growth conditions, a waveguide formed by overlayer 60 may consist of a poled pattern by growing domains in overlayer 60 wherein the sign of the nonlinear coefficient alternates between positive and negative from one domain to the next, as illustrated in FIG. 4(b). Seed layer 62' on support medium 64 comprises alternating regions of seed material "a" and "b" affecting different nonlinear coefficient properties so that upon the growth of overlayer 60', alternating domains 82, 84 are transformed or transposed into overlayer 60' during its growth forming a poled pattern 82, 84, as shown in FIG. 4(b), with substantially formed vertical walls 80 between domains 82, 84.

Figure 4C:
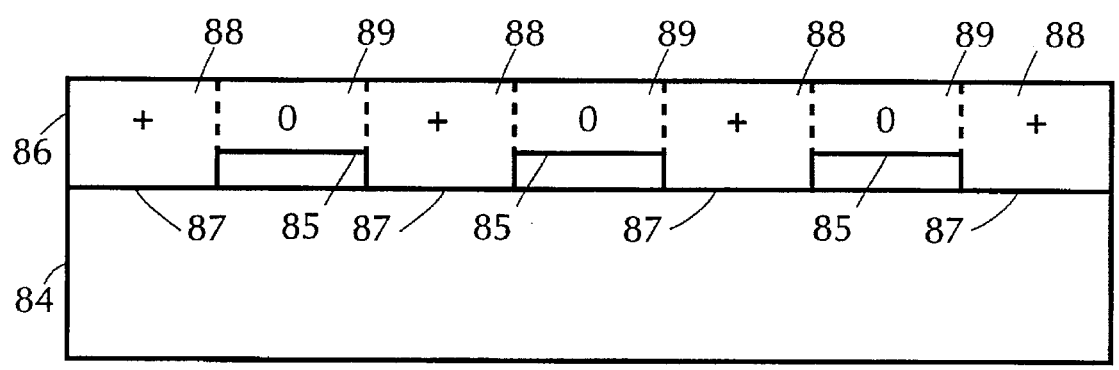
FIG. 4(c) is a side view of a device according to the second embodiment comprising an overlayer which is periodically modulated as-grown on a seed layer comprising one seed material.

Reference is made to FIG. 4(c) wherein there is an example illustrating a seed layer formed of a single seed material "a" or "b" comprising a series of spatially disposed regions 85 over which overlayer 86 is formed. In the case here, a photoresist layer is deposited, exposed, developed to form a series of spatially disposed photoresist strips on support medium 84, such as sapphire. Next, a seed layer comprising material "b", e.g., comprising SiO$_2$, is deposited on support medium 84 to form a pattern of spatially disposed strips 85 of SiO$_2$ by means of liftoff Alternatively, the pattern of SiO$_2$ strips can be accomplished by selective etching. The result is a pattern of spatially disposed SiO$_2$ strip regions 87 exposing the surface of sapphire support medium 84. What remains now is a spatial pattern according to the desired coherence length comprising SiO$_2$ strips 85 between regions 87 of exposed surface of support medium 84. Next, overlayer 86, e.g., LiTaO$_3$, is deposited by means of sputtering, as described previously, on the surface to a desired thickness, such as 250 nm. As overlayer 86 is deposited, it is patterned according to the underlying material. In the case here, domains 88 are transformed relative to the exposed region of support medium 84 resulting in domains of positive polarization. Domains 89 have a nonlinear coefficient of zero since they are formed overlying SiO$_2$ strips 85.

In this FIG. 4(c) example of the second embodiment, a simple approach is provided in forming an overlayer 86 to function as the nonlinear waveguide by employing a single seed material that can be easily patterned according to the coherence length to form the appropriate periodic nonlinear coefficient pattern. As an alternative to layer 86 comprising initially a "b" seed material, this layer may be initially deposited as an "a" seed material so that the resulting pattern transformed into overlayer 86 may be a periodic nonlinear coefficient pattern.

Alternatively, a periodic nonlinear coefficient pattern in overlayer 60 or 86 may be provided with the same sign by, first, forming a series of spatially disposed domains having a first positive or negative nonlinear coefficient with adjacent domains having a magnitude significantly smaller than the magnitude of the first, sign-selected nonlinear coefficient pattern of domains.

As previously described, if the index difference between the overlayer and substrate or sublayer is not sufficiently large to provide an overlayer as a waveguide, the index of refraction of the overlayer can be increased by proton exchange or titanium indiffusion, or the index of refraction of the substrate or sublayer can be reduced through doping.

Figure 5B:
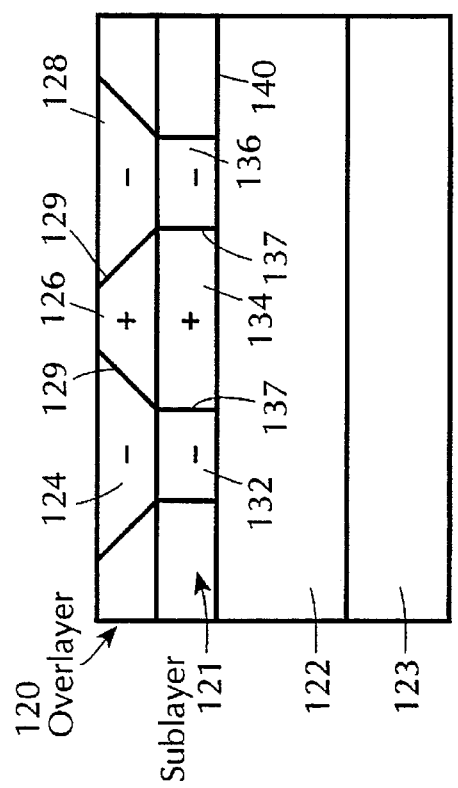
FIG. 5(b) is a side view of a device according to the third embodiment in which a periodic poled surface pattern formed along the bottom surface of the previously grown overlayer is transposed into an underlying sublayer.

3. Periodic Nonlinear Coefficient Patterning from an Overlayer into an Underlayer In a third embodiment of the invention, illustrated in FIGS. 3(a) and 3(b), instead of periodic nonlinear coefficient patterning of the underlayer and growing an overlayer replicating or transposing the patterning of the underlayer into the overlayer forming a waveguide device, an underlayer with an already formed thin film overlayer is thereafter provided with a periodic nonlinear coefficient pattern. The underlayer may be an oxide substrate or may be an oxide sublayer grown on a buffer layer above a semiconductor substrate. The overlayer may be chosen to have a low Curie temperature or low coercitivity field for domain reversal, even though it may not be an optimal frequency doubling material. The overlayer is then periodically patterned by a surface initiated technique on the upper surface of overlayer 100, 120, such as titanium indiffusion, proton diffusion, ion exchange or electric field induced periodic poling or modulation. As previously indicated, these methods and conditions of periodic nonlinear coefficient patterning are well known to those skilled in the art. During periodic nonlinear coefficient patterning, a plurality of domains 90, 91, 92, in the case of FIG. 5(a), and 124, 126, 128, in the case of FIG. 5(b), are formed in respective overlayer 100, 120. The conventional patterning of overlayer 100, 120 is not extended into underlayer 106, 121 by the surface initiated technique. Instead, the formed periodic nonlinear coefficient patterning in overlayer 100, 120 is concurrently transposed or migrated into the underlying layer or medium by means of inducement due to a charge cascade effect or dipole effect involving c-axis displacement of atoms in the nonlinear material formed in the patterning of overlayer 100, 120. The natural dipole field developed in the overlayer due to the displacement of charge escapes downwardly through the layer and is transposed in a cascading manner into underlayer 106, 122 inducing therein a displacement of charge setting up a series of poled domains in the underlayer. This transposition occurs due to the attraction of the charge field to ground. In the case here, substrates 105 or 123 are connected to ground to provide the establishment of this cascading effect. As a result, as in the case of previously described embodiments, a replication of domains in overlayer 100, 120 is transformed into underlayer 106, 122 with domain boundaries having substantially straight vertical side walls.

Figure 5A:
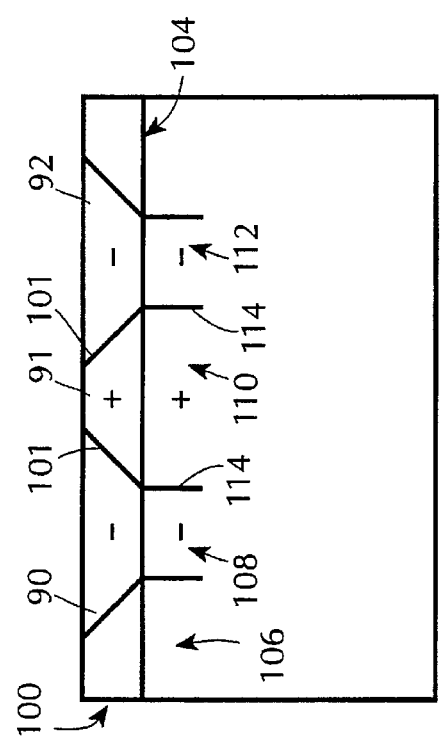
FIG. 5(a) is a side view of a device according to a third embodiment of this invention in which a periodic poled surface pattern formed along the bottom surface of the previously grown overlayer is transposed into the substrate.

With particular reference now to FIG. 5(a), overlayer 100, e.g., LiNbO₃, is epitaxially formed on substrate 105, e.g., LiNbO₃. Alternatively, overlayer 100 may be LiTaO₃ layer patterned by proton exchange and annealed. Overlayer 100 of LiNbO₃ is then poled by titanium indiffusion into domains 90, 92 which form trapezoidally shaped configurations in the overlayer of oppositely poled segments. However, in spite of the angular domain boundaries 101, the pattern of domains 90, 91, 92 formed in overlayer 100 provides a pattern of rectangular shape, poled regions along its lower surface 104 at its interface with underlying support medium 105. Although the formed walls or boundaries 101 between the domains in overlayer 100 are not vertical, relative to the planar extent of surface 104, the field transposed or field induced domains 108, 110, 112 in underlying substrate 105 are formed with substantially vertical wall boundaries 114 in substrate 105. The domains 108, 110, 112 in substrate 105 form a periodic nonlinear coefficient pattern wherein each of these domains has substantially the same width, length and pattern as the width, length and pattern at the film interface on lower surface 104 of overlayer 100. As previously indicated, vertical boundaries 114 are formed in underlying portion 106 in substrate 105 through transposition or migration of the charge induced field in overlayer 100. Thus, the natural charge field in overlayer 100 brings about a cascading effect relative to the dipole positioning, for example, of the lithium atoms and the niobium atoms or tantalate atoms with respect to the oxygen octahedra of the ferroelectric phase of LiNbO₃ or LiTaO₃ transposing the periodic nonlinear coefficient patterning from lower surface 104 of overlayer 100 directly into substrate 105.

In this embodiment, the transposed periodic nonlinear coefficient patterning portion 106 of substrate 105 is employed as the optical frequency conversion waveguide. The infrared laser light should be confined as much as possible to upper portion 106 of substrate 105 within the region of formed domains 108, 110, 112. The index of refraction of upper portion 106 of substrate 105 can be increased by methods previously mentioned above, such as proton exchange or titanium indiffusion. Overlayer 100 can be removed if desired by etching or polishing.

Similarly, as shown in FIG. 5(b), an unpatterned overlayer 120 can be grown on an unpatterned underlayer 121, which is fabricated on a light confining, buffer layer 122 formed on substrate 123. Overlayer 120 can be periodic nonlinear coefficient patterned with a surface-initiated technique creating domains 124, 126, 128 in the overlayer resulting in non-vertical boundaries 129 formed between the domains. The established patterning in overlayer 120 is charge field transposed, at the interface between overlayer 120 and underlayer 121, into underlayer 121 due to the above described cascading effect, forming rectangular prismatic-shaped configured domains 132, 134, 136 with substantially vertical boundaries 137 throughout the thickness of underlayer 121. In the case here, the optical frequency conversion waveguide is underlayer 121.

In order to improve the cascading effect into underlayers 106, 121, a very thin conductive film, such as a layer of Pt or ITO having a thickness of about 10 Å, may be formed at interface 140 between underlayer 121 and buffer layer 122. This thin conductive layer, as grounded, will aid in carrying away the cascading charge while not interfering with the optical waveguiding properties of underlayer 121, such as detrimental functioning as a light absorber to waveguiding underlayer 121. In transposing the charge cascading effect through underlayer 121, it is necessary that there be some drawing off of the charge from below underlayer 121. This can occur over time with the grounding of substrate 123. However, with the addition of the thin conductive layer at interface 140, the charge draw-off can be accomplished much more rapidly, and likely improve the formation of vertical domain boundaries 137 in underlayer 121.

In this embodiment, alternative periodic nonlinear coefficient patterning can be employed as in the case of previous embodiments. Also, appropriate materials for either overlayer 100, 120 or underlayer 105, 122 include LiTaO₃, LiNbO₃, BaTiO₃, KTP, KNbO₃ and SBN.

Although the invention has been described with reference to preferred embodiments, it will be apparent to one skilled in the art that variations and modifications are contemplated as being within the spirit and scope of the invention. The description and drawings of the preferred embodiments are presented by way of example rather than to limit the scope of the invention so that the invention, as claimed, covers all changes and modifications that are within the spirit and scope of the claims.

We claim:

1. A method of forming a nonlinear, frequency converting waveguide comprising an overlayer formed on an underlayer, the step of:

patterning the underlayer into a plurality of first regions having a periodic pattern along an upper surface thereof with each of said first regions along the upper surface having a substantially rectangular shape, and epitaxially growing the overlayer on the underlayer upper surface concurrently replicating the periodic patterning of the underlayer upper surface as the growth of the overlayer progresses forming a plurality of substantially rectangular prismatic-shaped second regions in the overlayer having substantially vertical domain boundaries.

2. The method of claim 1 wherein said periodic pattern in said underlayer is a periodic nonlinear coefficient pattern comprising alternating pattern of domains of positive and negative nonlinear coefficients.

3. The method of claim 1 wherein said periodic pattern in said underlayer is a periodic nonlinear coefficient pattern comprising alternating domains of either a first positive or of a first negative nonlinear coefficient and of a second nonlinear coefficient having a magnitude significantly smaller than a magnitude of the first nonlinear coefficient.

4. The method of claim 1 wherein said periodic pattern in said underlayer is a periodic nonlinear coefficient pattern comprising alternating domains of either a first positive or of a negative nonlinear coefficient and of a second nonlinear coefficient having a magnitude equal to zero.

5. The method of claim 1 wherein said periodic pattern in said underlayer is a periodic nonlinear coefficient pattern comprising a poling pattern of alternating domains of reversed polarization.

6. The method of claim 1 wherein said periodic pattern in said underlayer comprises a seed layer wherein periodic patterning of the underlayer upper surface induces a periodic nonlinear coefficient pattern in the overlayer forming a plurality of substantially rectangular prismatic-shaped second regions in the overlayer having substantially vertical domain boundaries.

7. The method of claim 6 wherein said periodic nonlinear coefficient pattern in said overlayer comprises alternating pattern of domains of positive and negative nonlinear coefficients.

8. The method of claim 6 wherein said periodic nonlinear coefficient pattern in said overlayer comprises alternating domains of either a first positive or of a first negative nonlinear coefficient and of a second nonlinear coefficient having a magnitude significantly smaller than a magnitude of the first nonlinear coefficient.

9. The method of claim 6 wherein said periodic nonlinear coefficient pattern in said overlayer comprises alternating domains of either a first positive or of a negative nonlinear coefficient and of a second nonlinear coefficient having a magnitude equal to zero.

10. The method of claim 6 wherein said periodic nonlinear coefficient pattern in said overlayer comprises a poling pattern of alternating domains of reversed polarization.

11. The method of claim 6 wherein said seed layer comprises a periodic pattern of at least one seed material.

12. The method of claim 11 wherein in said seed material is selected from the group consisting of $Si_3N_4$, $SiO_2$, $Al_2O_3$, and MgO.

13. The method of claim 6 wherein said seed layer comprises a periodic pattern of two seed materials.

14. The method of claim 13 wherein in one of said seed materials is selected from the group consisting of $Si_3N_4$, $SiO_2$, and the other of said seed materials is selected from the group consisting of $LiTaO_3$ $LiNbO_3$, $Al_2O_3$, and MgO.

15. A method of forming a nonlinear, frequency converting waveguide comprising an underlayer with an overlayer epitaxially grown thereon, the steps of:

patterning the epitaxially grown overlayer into a plurality of first regions having a periodic nonlinear coefficient pattern formed along a lower surface thereof with each of said first regions along the lower surface having a substantially rectangular shape, and transposing the periodic nonlinear coefficient pattern formed along a lower surface of the overlayer into the underlayer transforming the lower underlayer into a plurality of substantially rectangular prismatic-shaped second regions in the underlayer having substantially vertical domain boundaries.

16. The method of claim 15 wherein in said step of transposing is carried out by the migration of a charge induced field created in the overlayer during the periodic nonlinear coefficient patterning of the overlayer.

17. The method of claim 16 including the step of providing a thin conductive layer beneath the underlayer to attract the charge induce field without affecting the resulting optical waveguiding properties of the underlayer.

18. The method of claim 17 wherein said thin conductive layer is selected from the group consisting of Pt and ITO.

19. A method for periodically poling an epitaxially-grown, nonlinear thin film overlayer comprising a first ferroelectric oxide to form a device wherein said overlayer is employed as a nonlinear, frequency conversion, optical waveguide, said method comprising the steps of:

periodically poling an underlayer comprising a second ferroelectric oxide into a first plurality of domains wherein a first domain from said first plurality of domains has a first nonlinear coefficient status different from a second nonlinear coefficient status of domains adjacent to said first domain, and wherein said first plurality of domains form a plurality of substantially rectangular shaped patterns along an upper surface of said underlayer, and epitaxially growing said overlayer on top of said underlayer, said epitaxial growth concurrently replicating the periodic poling into said overlayer whereby a pattern comprising a second plurality of domains having substantially rectangular prismatic-shaped configuration are formed through an entire thickness of said overlayer so that each of said domains from said second plurality of domains having substantially the same length, width and nonlinear coefficient status as the length, width, and nonlinear coefficient status of said upper surface.

20. The method of claim 19 wherein said fast nonlinear coefficient status comprises a positive nonlinear coefficient and said second nonlinear coefficient status comprises a negative nonlinear coefficient.

21. The method of claim 19 wherein said fast nonlinear coefficient status comprises a first positive or negative nonlinear coefficient and said second nonlinear coefficient status comprises a second nonlinear coefficient having a magnitude significantly smaller than a magnitude of said fast nonlinear coefficient or a magnitude equal to zero.

22. The method of claim 19 wherein the length of each domain in said second plurality of domains is approximately equal to the coherence length $l_c$.

23. The method of claim 19 wherein said fast ferroelectric oxide and said second ferroelectric oxide are comprised of a material selected from the group consisting of $LiTaO_3$, $LiNbO_3$, $BaTiO_3$, KTP, $KNbO_3$, KTO and SBN.

24. The method of claim 19 wherein said growth of said overlayer is homoepitaxial.

25. The method of claim 19 wherein said growth of said overlayer is heteroepitaxial, such that said fast ferroelectric oxide is different composition from said second ferroelectric oxide.

26. The method of claim 19 wherein said underlayer is a substrate.

27. The method of claim 19 wherein, before the periodic poling of said underlayer, a buffer layer is grown on a semiconductor substrate and said underlayer is thereafter epitaxially grown on said buffer layer.

28. The method of claim 19 wherein after said epitaxial growth of said overlayer, said method further comprises the step of:

providing a lower index of refraction in said overlayer compared to said underlayer so that when infrared laser light is incident upon an input surface of said waveguide, the light is substantially confined to said overlayer and at least a portion of the light is converted to a shorter wavelength of light.

29. The method of claim 19 including the step of alloying said underlayer with a material to raise the Curie temperature of said underlayer.

30. The method of claim 19 wherein said underlayer is periodic nonlinear coefficient patterning is accomplished at a low processing temperature.

31. The method of claim 19 wherein said underlayer has a low coercitivity field for domain reversal during the epitaxial grow of said overlayer.

32. A method for periodically poling an epitaxially-grown, nonlinear thin film overlayer comprising a ferroelectric oxide to form a structure wherein said overlayer is employed as nonlinear, frequency conversion, optical waveguide, comprising the steps of:

epitaxially growing a seed layer on a support medium, said seed layer comprising alternating regions of two different materials, said regions being substantially rectangular at least along an upper surface of said seed layer, and epitaxially growing said overlayer on said seed layer whereby said overlayer is concurrently transposed into a plurality of domains having a periodically nonlinear coefficient pattern, each of said domains formed above one of said regions with a first domain having a first nonlinear coefficient status and a second domain adjacent said first domain having a second nonlinear coefficient status, both of said status depending upon properties of said alternating regions, each of said domains has a rectangular prismatic-shaped configuration throughout the thickness of said overlayer.

33. The method of claim 32 wherein the length of each domain in said plurality of domains is approximately equal to the coherence length $l_c$.

34. The method of claim 32 wherein said first nonlinear coefficient status comprises a positive nonlinear coefficient and said second nonlinear coefficient status comprises a negative nonlinear coefficient.

35. The method of claim 32 wherein said first nonlinear coefficient status comprises a first positive or negative nonlinear coefficient and said second nonlinear coefficient status comprises a second nonlinear coefficient which has a magnitude significantly smaller than a magnitude of said first nonlinear coefficient or a magnitude equal to zero.

36. The method of claim 32 further comprising, before growing said seed layer, the additional step of growing a buffer layer on said substrate and growing said seed layer on said buffer layer.

37. The method of claim 32 wherein said ferroelectric oxide is comprised of a material selected from the group consisting of $LiTaO_3$, $LiNbO_3$, $BaTiO_3$, KTP, $KNbO_3$, KTO and SBN.

38. The method of claim 37 wherein said at least two materials in said seed layer comprise at least two materials selected from the group consisting of $SiO_2$, $Si_3N_4$, $Al_2O_3$, MgO or the same material comprising said substrate.

39. A method for periodically poling an underlayer comprising a first ferroelectric oxide to form a device wherein said underlayer is employed as a nonlinear, frequency conversion, waveguide beneath an epitaxially-grown, thin film overlayer comprising a second ferroelectric thin oxide film comprising the steps of:

periodically poling said overlayer by a surface-initiated technique along an upper surface of said overlayer, thereby forming a first plurality of domains throughout said overlayer forming a periodic nonlinear coefficient patterning comprising a first set of domains having a first nonlinear coefficient status different alternated with a second set of adjacent domains having a second nonlinear coefficient status different from said first nonlinear coefficient status, and transposing said nonlinear coefficient patterning into said underlayer whereby a second plurality of domains of substantially rectangular prismatic-shaped configuration are formed in said underlayer wherein each of said second plurality of domains has substantially the same length, width, and first nonlinear coefficient status as the length, width and first nonlinear coefficient status of said first plurality of domains.

40. The method of claim 39 wherein the length of each domain in said second plurality of domains is approximately equal to the coherence length $l_c$.

41. The method of claim 39 wherein said first nonlinear coefficient status comprises a positive nonlinear coefficient and said second first nonlinear coefficient status comprises a negative nonlinear coefficient.

42. The method of claim 39 wherein said first nonlinear coefficient status comprises a first positive or negative nonlinear coefficient and said second first nonlinear coefficient status comprises a second nonlinear coefficient which has a magnitude significantly smaller than the magnitude of said first nonlinear coefficient or a magnitude equal to zero.

43. The method of claim 39 wherein said first ferroelectric oxide and said second ferroelectric oxide are selected from the group consisting of $LiTaO_3$, $LiNbO_3$, $BaTiO_3$, KTP, $KNbO_3$, KTO and SBN.

44. The method of claim 39 wherein said underlayer is a substrate.

45. The method of claim 39 wherein, before the periodic poling of said underlayer, a buffer layer is grown on a semiconductor substrate and said underlayer is thereafter epitaxially grown on said buffer layer.

46. The method of claim 39 wherein infrared laser light is focused at one end of said underlayer wherein its formed periodic nonlinear coefficient patterning functions to convert at least a portion of the light into a shorter wavelength of light at an opposite end of said underlayer.

47. The method of claim 39 wherein said overlayer periodic nonlinear coefficient patterning is accomplished at a low processing temperature.

48. The method of claim 39 wherein said overlayer has a low coercitivity field for domain reversal during the periodic nonlinear coefficient patterning of said overlayer.

* * * * *

UNITED STATES PATENT AND TRADEMARK OFFICE
CERTIFICATE OF CORRECTION

PATENT NO. : 5,654,229

DATED : August 5, 1997

INVENTOR(S) : Florence E. Leplingard et al.

It is certified that error appears in the above-indentified patent and that said Letters Patent is hereby corrected as shown below:

On the title page: Item [73] change "Assignee: Xerox Corporation, Stamford, Conn." to -- Assignee: Xerox Corporation, Stamford, Conn. and SDL, Inc., San Jose, CA --

Signed and Sealed this

Eleventh Day of November, 1997

Attest:

BRUCE LEHMAN

Attesting Officer

Commissioner of Patents and Trademarks